United States Patent Office 2,817,689
Patented Dec. 24, 1957

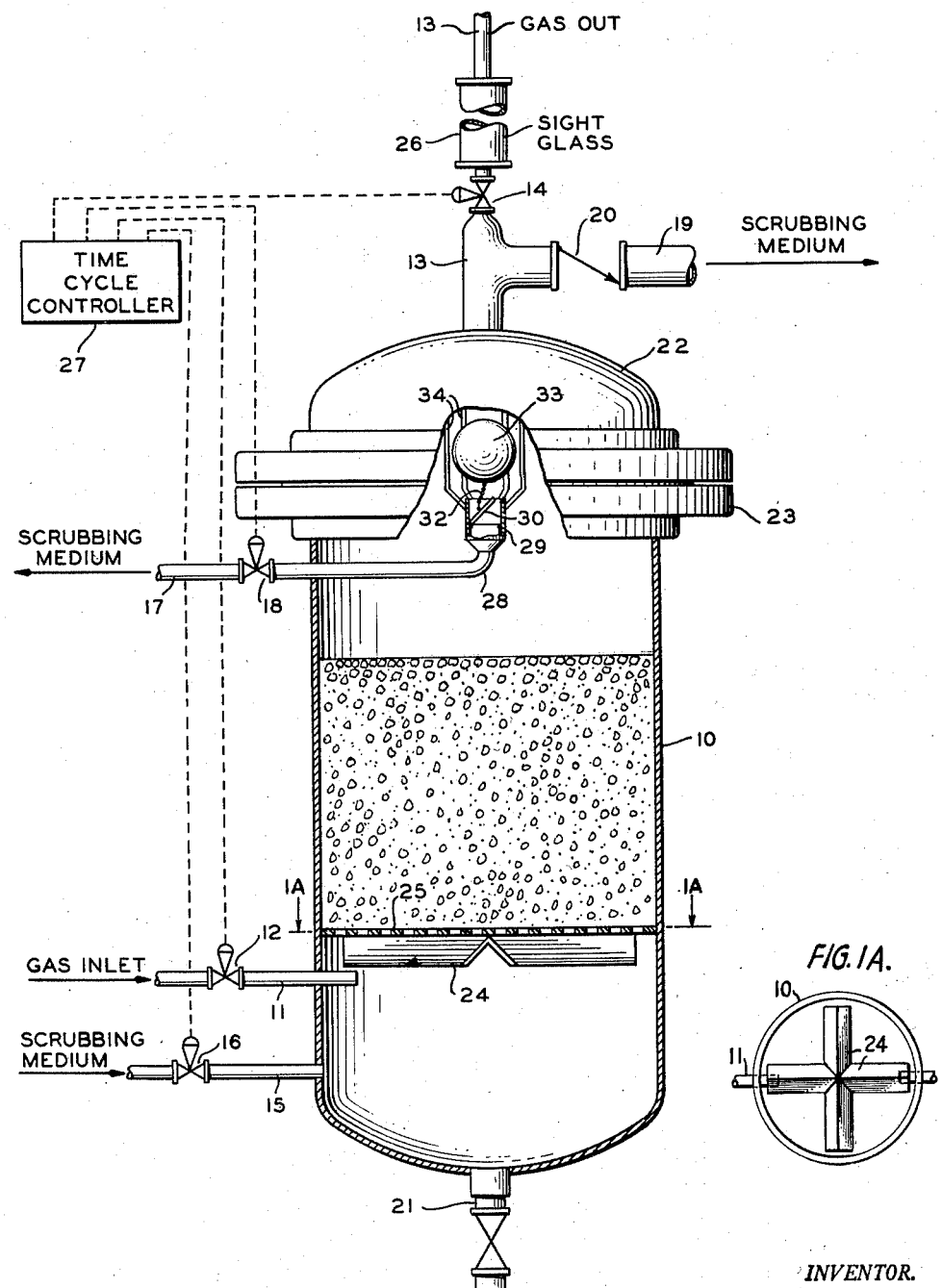

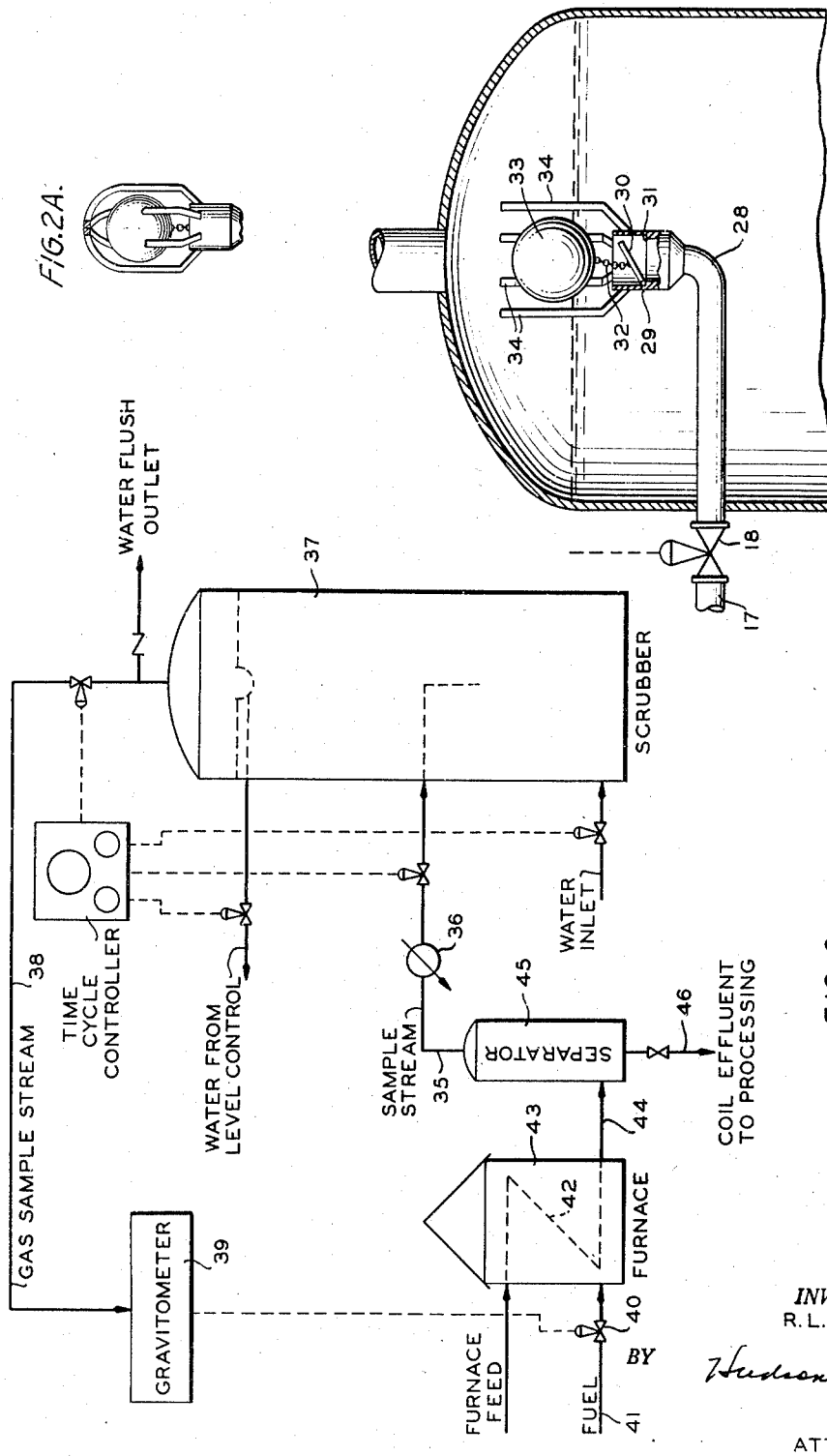

2,817,689

FLOOD TYPE GAS SCRUBBER

Roy Lucien White, Phillips, Tex., assignor to Phillips Petroleum Company, a corporation of Delaware Application September 30, 1953, Serial No. 383,241

13 Claims. (Cl. 260—677)

This invention relates to the purification of gases. In one aspect this invention relates to contacting successive portions of a fluid with successive portions of another fluid. In another aspect this invention relates to contacting successive portions of a fluid with successive portions of another fluid for a predetermined period of time. In another aspect, this invention relates to a method for the purification of gases. In another aspect, this invention relates to apparatus for the purification of gases. In another aspect, this invention relates to the removal of solid, liquid or gaseous impurities from a gas stream. In still another aspect, this invention relates to scrubbing a gas stream with water or other scrubbing medium. In still another aspect, this invention relates to scrubbing a gas with a scrubbing medium maintained substantially uncontaminated at all times. In still another aspect, this invention relates to a method for removing contaminated scrubbing medium from a gas scrubbing apparatus. In still another aspect, this invention relates to a method for intermittently removing at predetermined time intervals contaminated scrubbing medium from a gas scrubbing apparatus. In still another aspect, this invention relates to a method for continuously removing contaminated scrubbing medium from gas scrubbing apparatus. In still another aspect, this invention relates to a method for controlling relative to each other the introduction of gas and scrubbing medium to gas scrubbing apparatus. In still another aspect, this invention relates to gas scrubbing apparatus having means for establishing and controlling the level of scrubbing medium therein. In still another aspect, this invention relates to means for controlling relative to each other the introduction of gas and scrubbing medium to gas scrubbing apparatus. In still another aspect, this invention relates to removing impurities from a gas stream prior to determining the specific gravity of said gas. In still another aspect, this invention relates to removing impurities from the effluent stream of a gas cracking furnace prior to determining the specific gravity of said effluent stream and employing said specific gravity to control the operation of said furnace.

The treatment of industrial gases to remove various impurities, both dissolved and suspended, has long been practiced. Various types of scrubbers, washers, filters, etc. have been proposed and used for this purpose. Usually both the method of treatment and the apparatus employed depend to a large extent upon the type of impurity present. Some treating methods rely almost entirely upon a chemical reaction between the impurity and the treating medium while others rely almost entirely upon physical contact between the impurity and the treating medium. An example of the former is the use of amines to remove acidic gaseous impurities from a gas. An example of the latter would be to employ a simple water wash or a filter to remove suspended dust particles. Of course, some methods include both chemical treatment and physical contact. All these methods have one problem in common, i. e., the problem of maintaining an uncontaminated treating medium in order to provide efficient treating. Some processes employ continuous circulation and regeneration of the treating medium. Others employ batch methods with infrequent and sporadic changes of treating medium. Continuous circulation and regeneration of the treating medium works very well in those instances wherein the treating process is an integrated portion of a large scale continuous process. However, there are many instances where continuous circulation and regeneration is not practical.

One instance where continuous circulation and regeneration of the treating medium is not practical is where a small stream is withdrawn from a larger stream through a treater prior to analysis for controlling the composition of the larger stream.

Even when using water, generally the most inexpensive treating medium, there are times when the cost of the water so used, whether it is reconditioned or discarded, is appreciable. In such instances, past practice has been to employ batch methods with infrequent and sporadic changes of treating medium resulting in periods of under treating.

My invention overcomes these difficulties by providing a gas scrubbing method and apparatus therefor having the advantage of employing a substantially uncontaminated scrubbing medium at all times, and yet, retaining the advantages which make batch operation desirable in many processes.

Thus according to the invention there is provided a method of supplying and employing successive portions of a contacting fluid to contact successive portions of another fluid in a contacting zone which comprises, automatically and periodically discontinuing the flow of said another fluid and during the discontinuance of the flow of said another fluid rapidly and automatically replacing said contacting fluid in said zone by displacement with a succeeding portion of said contacting fluid.

Further, according to the invention, there is provided a method of scrubbing a gas or vapor to remove impurities therefrom which comprises the cycle of passing a stream of said gas through a scrubbing medium within a scrubbing zone for a predetermined period of time, discontinuing said gas stream for a succeeding predetermined period of time, during discontinuance of said gas stream preferably substantially simultaneously therewith passing fresh scrubbing medium through said scrubbing zone to flush contaminated medium therefrom and repeating said cycle.

Also according to the invention, there is provided an apparatus for scrubbing a gas to remove impurities therefrom which comprises, in combination, a vessel having gas inlet means, gas outlet means, scrubbing inlet means, and scrubbing medium outlet means; control valves positioned in each of said means as a part thereof and a cycle timer to actuate said valves in predetermined relation with each other. In one embodiment of the invention level control means within said vessel are provided.

Also according to the invention it is preferred to so place the said inlet and outlet means that flow of the scrubbing medium or contacting fluid during the replacement operation is upward so as to provide an effective flush of said vessel.

Further, in accordance with the invention, there is provided a method for controlling the operation of a furnace which comprises scrubbing a portion of the gaseous effluent of said furnace, determining the specific gravity of said scrubbed gas and controlling the amount of heating medium passed to said furnace in accordance with said specific gravity.

Still further according to the invention, there is provided as a subcombination of the apparatus of the invention a liquid level controller which comprises, a swinging gate check valve, a float, a connecting member attached to the swinging gate of said check valve and to said float, and guide means attached to said check valve and extending therefrom to surround said float and provide a zone of operation for said float.

Throughout this specification and in the appended claims the words "fluid" and "medium" can mean liquid.

Figure 1 is a side elevation view, partly in section, of one form of apparatus which can be used to carry out the method of the invention.

Figure 1A is a plan view of the gas distributor in the apparatus shown in Figure 1.

Figure 2 is a side elevation view, partly in section, of the liquid level controller of the invention.

Figure 2A shows another embodiment of the liquid level controller shown in Figure 2.

Figure 3 is a diagrammatic flow sheet illustrating the employment of the invention in an improved method for controlling the operation of a furnace.

In the drawings, like reference numerals have been used to denote like items. In Figure 1 there is illustrated a vertically disposed gas scrubber vessel 10 having a gas inlet 11 controlled by motor valve 12, a gas outlet 13 controlled by motor valve 14, a scrubbing medium inlet 15 controlled by motor valve 16, a scrubbing medium outlet 17 controlled by motor valve 18, a scrubbing medium overflow line 19 having check valve 20 therein, a valved drain line 21, and a top portion 22 secured to the main body of vessel 10 by means of flanges 23.

Gas inlet means 11 is positioned in the lower portion of and preferably extends into gas scrubber vessel 10. Located within gas scrubber 10 and positioned above gas inlet 11 is a gas distributor 24 supported from the wall of vessel 10 by suitable supports (not shown). Said gas distributor serves to distribute evenly over the area of vessel 10 the incoming gas from gas inlet 11. Positioned above and adjacent gas distributor 24 is diffusion plate or screen 25 which serves to further diffuse the incoming gas into the scrubbing medium.

Gas outlet means 13 is secured to and extends upwardly from top portion 22. Scrubbing medium overflow line 19 extends from a T positioned between top portion 22 and motor valve 14 in line 13. Check valve 20 in line 19 is preferably of the swinging gate type and is equipped with a weighted gate so as to maintain only a few ounces of pressure within vessel 10. However, other types of check valves can be employed. If desired or necessary, a sight glass 26 can be provided in outlet means 13, downstream from motor valve 14, for visual inspection of the scrubbed gas stream. Time cycle controller 27 is operatively connected to motor valves 12, 14, 16 and 18 so as to actuate said valves in predetermined relation with each other as explained further below.

Scrubbing medium inlet 15 is positioned in the lower portion of vessel 10 and preferably below gas inlet 11. Scrubbing medium outlet 17 is positioned in the upper portion of vessel 10 but below flanges 23 and preferably extends into vessel 10 to approximately the center thereof. Upwardly facing L 28 is attached to the inner end of outlet 17.

Referring now to Figure 2, there is illustrated the completely internal, self-sealing liquid level controller of the invention. Swinging gate check valve 29 is attached to L 28 in a vertical position so that weighted gate 30 will be in closed position against seat 31 except when raised by means of connecting member 32 and float 33 as shown. Attached to the body of check valve 29 at spaced intervals therearound are a plurality of guide rods 34 which extend outwardly and upwardly from said valve body to surround float 33 and provide a vertical zone of operation therefor. In one embodiment of the invention said guide rods can be curved and joined at their upper extremities so as to form a cage as shown in Figure 2A. Such cage would, in the event of a break in connecting member 32, contain float 33 and prevent its possible blocking of outlet 13.

My self-sealing, internally-operating liquid level controller possesses several advantages over those formerly available to the art. It should be noted that since float 33 floats well above the opening into check valve 29, a liquid seal is maintained at all times and no gas is lost through outlet 17. This feature makes my liquid level controller particularly well adapted for those processes wherein a gas phase is maintained above a level controlled liquid phase as in the present invention. Since the level controller is completely internal, with respect to the vessel in which it is employed, there is no necessity for openings in the vessel wall other than the outlet to which it is attached. This eliminates packing glands for float arms, etc. and is a great advantage in the construction and operation of pressure equipment. By proper adjustment of the float size, the weight of the swinging gate, the length of the member connecting said float and said gate, relative to each other and the liquid to be controlled, the sensitiveness of the level controller can be varied as desired.

However, it should be understood that other liquid level control means can be employed alternative to that illustrated and described herein. For example a system of electrical contacts within the scrubbing vessel can be employed to actuate valve 18 in cooperation with time cycle controller 27. By suitable connections such a level controller could be made to actuate valve 18 during the times when valve 18 is normally open responsive to time cycle controller 27, but not during times when said valve is normally closed responsive to cycle controller 27. Or, if desired, the system of electrical contacts can be employed to actuate an additional valve (not shown) in line 17.

In operation vessel 10 is first filled to the desired level with scrubbing medium. This level will depend upon the weight of gate 30, the length of connecting member 32 and the buoyancy of float 33 in the selected scrubbing medium as well as the height of outlet 17. Motor valves 12, 14, 16 and 18 are then placed on automatic operation controlled by time cycle controller 27 with valve 16 in close position and valves 12, 14 and 18 in open position. The gas to be scrubbed is introduced through inlet 11, bubbled through scrubbing medium in vessel 10 and withdrawn through outlet means 13 for further processing or use as desired. Any increase in volume of scrubbing medium due to solution or dispersion of gas therein or removal of impurities from the gas being scrubbed will automatically be removed by means of the level control provided. As the level in vessel 10 increases, float 33 will raise gate 30 from seat 31 to allow liquid to pass through outlet 17. At the end of a predetermined time, for example, one hour, time cycle controller 27 actuates motor valves 12, 14 and 18 to closed position and actuates motor valve 16 to open position. Thus fresh scrubbing medium is introduced through inlet 15 and allowed to "flood" vessel 10 and overflow through line 19 for a predetermined period of time, for example, one minute, to flush out contaminated scrubbing medium. Thus one cycle is completed. At the end of the one minute flushing period time cycle controller 27 actuates valve 16 to closed position, the level control establishes the desired level in vessel 10, time cycle controller actuates valves 12, 14 and 18 to open position and the cycle is repeated. It should be noted that during the flushing period float 33 will hold gate 30 open. However, no scrubbing medium passes through outlet 17 since valve 18 is closed. At the end of the flushing period valve 16 is closed and valve 18 is opened to permit excess scrubbing medium to drain back and establish the desired level in vessel 10. Thus the level control automatically establishes the desired level and maintains a space above the scrubbing medium. Said space prevents or effectively minimizes "carry-over" of scrubbing medium into outlet 13 during the scrubbing period. Care should be taken in setting time cycle controller 27 to provide that valve 16 is closed before valves 12, 14 and 18 are opened and vice versa.

While in the now preferred embodiment of the invention it is preferred to so set time cycle controller 27 that the said motor valves operate in the sequence described, it is within the scope of the invention to vary the described sequence in accordance with operating practice. For example, the sequence of valve operation could be varied to provide for continuous flow of scrubbing medium through the scrubbing vessel and to periodically flush said vessel. In such instance the sequence of valve operation, assuming the apparatus is on stream, would be as follows. Set time cycle controller 27 to hold motor valves 12, 14, 16 and 18 open for a predetermined period of time to provide for continuous simultaneous flow of scrubbing medium through said vessel. After said predetermined period of time, time cycle controller 27 would actuate valves 12, 14 and 18 to closed position to flush out the scrubbing vessel for a predetermined period of time. The time cycle controller would then actuate valves 12, 14 and 18 to open position and the cycle repeated. If desired, but not now preferred, in all the described embodiments time cycle controller can be set so as to provide for either complete opening and closing of said valves in proper sequence, or, it can be provided that valves to be opened can be opening while valves to be closed are closing.

Figure 3 is a diagrammatic flow sheet illustrating one embodiment of the invention wherein the gas scrubbing method and apparatus are employed in an integrated system for controlling the depth of cracking in a hydrocarbon gas cracking furnace. Hydrocarbon gas, for example, butane, is passed through coil 42 in furnace 43 operated under cracking conditions well known to those skilled in the art. Coil effluent is passed through line 44 to separator 45 from which the major portion of said effluent is withdrawn through line 46 for further processing. A small sample of said coil effluent is withdrawn from separator 45 through line 35, cooler 36 and passed through scrubber 37 wherein said sample is scrubbed with water to remove suspended impurities therefrom according to the method of the invention as described above. Scrubbed gas is passed from scrubber 37 through line 38 to gravitometer 39 which actuates valve 40 in fuel line 41 to control the amount of fuel to furnace 43 thereby controlling the temperature in said furnace and depth of cracking in coil 42 in accordance with the specific gravity of said gas. As will be understood by those skilled in the art, gravitometer 39 can be adjusted to control valve 40 responsive to a desired predetermined gas specific gravity. If the specific gravity exceeds the desired value gravitometer 39 increases the amount of fuel to furnace 43 and more cracking occurs in coil 42. Similarly, a low specific gravity will cause a decrease in the amount of fuel to furnace 43. Gravitometer 39 is of conventional type well known to those skilled in the art.

*Example*

Prior to my invention, several attempts were made to control the depth of cracking, in a butane gas cracking furnace, by employing a gravitometer on a sample stream of the furnace coil effluent to control the fuel gas to said furnace. These attempts were unsuccessful. Suspended impurities such as carbon, tars and oils fouled the gravitometer causing erroneous specific gravity determinations and poor control. When employing my invention, as described above in connection with Figure 3, these difficulties have been eliminated. It has been found that when employing my invention the gravitometer can be operated, without cleaning, for periods in excess of 30 days to give entirely satisfactory control.

When employing the invention on a sample stream such as described above, it is generally preferable to operate at substantially atmospheric temperatures. Obviously, other temperatures can be employed. The temperature at which the scrubbing operation is carried out will depend upon the properties of the gas stream, the scrubbing medium employed, the impurities to be removed and considerations of the process with which the invention is employed.

Similarly, the pressure employed will depend upon the conditions under which the invention is employed. The gas scrubber of the invention has been described as operating at substantially atmospheric pressure, i. e., the few ounces maintained by the weighted gate in check valve 20. Obviously, by substituting a back pressure control valve for check valve 20 and a back pressure control valve on outlet 17, other pressures can be employed, limited only by the materials used in fabricating the scrubber vessel and the process in which the invention is employed.

The invention has been described as using water for a scrubbing medium. Other materials can be used depending upon the nature of the impurities to be removed. Indeed, it is within the scope of the invention to employ scrubbing mediums comprising solutions of one material in another. Examples of such would include mixtures of amines, aqueous solutions of various chemicals, etc. Or, two immiscible liquids can be used. Some impurities in gas streams repel water, i. e., are not easily wetted with water but are easily wetted and retained by certain oils or vice versa. In such instances a mixture of an oil and water can be used. The scrubbing medium should preferably have a low vapor pressure, otherwise vapors from the scrubbing medium may affect the specific gravity determinations or other use of the gas.

In some instances one may encounter a situation where only a certain scrubbing medium having a low vapor pressure will remove a particular impurity. In such instances, one can employ two of my gas scrubbers in series, one to remove the impurity, the other to remove entrained vapors from the scrubbing medium.

Two of my gas scrubbers can be used in parallel to continuously scrub a gas stream if desired. That is, while one scrubber is in the flooding step of the cycle, the other would be in the scrubbing step of the cycle and vice versa.

Time cycle controller 27 can be one of several types familiar to those skilled in the art. The device can comprise a clock mechanism controlling the rotation of a shaft having suitable cams thereon which actuate suitable power, mechanical, electrical and/or other means operatively connected to the valves to be opened and closed at predetermined intervals. Thus each position of the cam shaft effects a corresponding control of the apparatus.

The invention is not to be limited as to gas velocities. The gas velocity employed will depend upon equipment size and the conditions under which the invention is practiced as will be understood by those skilled in the art.

Any suitable gas distributor and diffuser plate or screen can be employed according to my invention. Likewise it is within the scope of the invention to employ packing material such as jack chain, rings, broken stone, etc., within the scrubber vessel to increase the degree of contact between the scrubbing medium and the gas being scrubbed. The scrubber vessel has been illustrated as a vertical vessel having two portions joined by flanges. Other types of vessels can be employed. For example, in large installations either vertical or horizontal vessels of one piece construction and having suitable "manholes" can be employed.

The invention has been described as employed in an integrated system wherein the depth of cracking in a butane cracking furnace is controlled. The invention can be used in systems wherein other hydrocarbons are cracked. Examples of such hydrocarbons would be ethane, propane, pentane, etc. or mixtures thereof including mixtures with butane.

Likewise it is within the scope of the invention to scrub the effluent combustion gases from a furnace to remove certain components and/or impurities therefrom, determine the specific gravity of the scrubbed gases and control the admission of a heating medium to said furnace.

The invention has been described as applied to gas scrubbing. However, it should be understood that the invention is in the modus operandi described. Thus the invention could be employed in processes involving chemical reactions wherein one or more fluids are contacted with another fluid. Examples of such processes would be alkylation, polymerization, etc.

Reasonable variation and modification are possible within the scope of the foregoing disclosure, the drawings and the appended claims to the invention, the essence of which is that a method and apparatus for maintaining substantially uncontaminated contacting fluid in a contacting zone wherein successive portions of said contacting fluid are employed to contact successive portions of another fluid flowing through said zone which comprises automatically and rapidly replacing said contacting fluid while simultaneously discontinuing flow of said another fluid and employing said method and apparatus in an integrated system to control the depth of cracking in a gas cracking zone.

I claim:

1. A method for controlling the operation of a heating zone wherein a heating medium is burned to form a gaseous effluent which comprises: scrubbing successive portions of said gaseous effluent from said heating zone with successive portions of a scrubbing medium, determining the specific gravity of said scrubbed gas and controlling the amount of a heating medium passed to said heating zone in accordance with said specific gravity.

2. A method for controlling depth of cracking in a gas cracking operation wherein a hydrocarbon gas is cracked in a heating zone which comprises, passing a stream of said cracked hydrocarbon gas effluent from said heating zone into intimate contact with a scrubbing medium over a predetermined distance within a scrubbing zone for a predetermined period of time as a first step of a cycle, discontinuing said gas stream for a succeeding period of time and simultaneously passing fresh scrubbing medium through said scrubbing zone during said succeeding predetermined period of time as a second step of said cycle, repeating said cycle to thereby scrub successive portions of said gas with successive portions of said scrubbing medium, determining the specific gravity of said scrubbed gas and controlling the amount of heating medium passed to said heating zone in accordance with said specific gravity.

3. The method of claim 2 wherein said gas is butane, said scrubbing medium is water, said predetermined period of time is one hour, said succeeding predetermined period of time is one minute, and said scrubbing medium is passed upwardly through said scrubbing zone.

4. An apparatus for scrubbing a gas to remove impurities therefrom which comprises: a vertically positioned substantially cylindrical vessel; a gas inlet extending into the lower portion of said vessel, said gas inlet having a motor valve therein; a gas outlet extending from the upper portion of said vessel; a motor valve in said gas outlet; an overflow line extending from a T positioned in said gas outlet between said motor valve and said vessel, said overflow line having a check valve therein; a scrubbing medium inlet; a motor valve in said scrubbing medium inlet; a scrubbing medium outlet; a motor valve in said scrubbing medium outlet; liquid level control means within said vessel; and a time cycle controller operatively connected to each of said motor valves.

5. An apparatus according to claim 4 wherein said vessel contains gas-liquid contacting packing material in a zone between said gas inlet and said scrubbing medium outlet.

6. An apparatus according to claim 4 wherein said liquid level control means comprises: a swinging gate check valve operatively connected to said scrubbing medium outlet; a float; a flexible member attached at one end to the swinging gate of said check valve and at the other end thereof to said float, thus adapting said float to float freely in both a horizontal direction and a vertical direction within a confined zone of operation described hereinafter; a plurality of guide rods attached to and at spaced intervals around said check valve, said guide rods extending outwardly and upwardly from said check valve to surround said float and provide a vertical zone of operation for said float.

7. An apparatus for scrubbing a gas to remove impurities therefrom which comprises: a vertically positioned substantially cylindrical vessel; a gas inlet positioned in the lower portion of and extending into said vessel, said gas inlet having a motor valve therein; gas distributing means positioned above said gas inlet within said vessel; gas diffusion means above and adjacent said gas distributing means; a gas outlet extending from the upper portion of said vessel; a motor valve in said gas outlet; an overflow line extending from a T positioned in said gas outlet between said motor valve and said top of said vessel, said overflow line having a check valve therein; a sight glass in said gas outlet downstream from said motor valve therein; a scrubbing medium inlet positioned in the lower portion of said vessel below said gas inlet; a motor valve in said scrubbing medium inlet; a scrubbing medium outlet positioned in the upper portion of said vessel but below said gas outlet and extending into said vessel to approximately the center thereof, said scrubbing medium outlet having an upwardly facing L on the inner end thereof; a vertically positioned valve body having a weighted swinging gate mounted therein, said valve body being operatively connected to said L; a ball float; a chain connected to said swinging gate and to said float; a plurality of guide rods attached to and at spaced intervals around said valve body, said guide rods extending outwardly and upwardly from said valve body to surround said float and provide a vertical zone of operation for said float and a time cycle controller operatively connected to each of said motor valves.

8. In a vessel having a liquid outlet extending thereinto and wherein a gas is scrubbed with a liquid, and wherein it is desired to establish and maintain a predetermined level during said gas scrubbing operation, a liquid level controller which comprises a swinging gate check valve operatively connected to said liquid outlet; a float; a flexible member attached at one end to the swinging gate of said check valve and at the other end thereof to said float, thus adapting said float to float freely in both a horizontal direction and a vertical direction within a confined zone of operation described hereinafter; a plurality of guide rods attached to and at spaced intervals around said check valve; said guide rods extending outwardly; upwardly and then inwardly from said check valve to form a cage surrounding said float and provide a vertical zone of operation for said float.

9. A method for scrubbing a gas with a scrubbing medium maintained within a scrubbing zone, which comprises: passing a stream of said gas into said scrubbing medium in said zone; distributing said gas over a cross section of said scrubbing medium; then dispersing said distributed gas into said scrubbing medium; contacting said dispersed gas and said scrubbing medium over a predetermined length of said zone for a predetermined period of time; withdrawing scrubbed gas from said zone; periodically at predetermined intervals of time discontinuing flow of said gas into said scrubbing medium and simultaneously during said discontinuance passing fresh scrubbing medium upwardly through said scrubbing zone to completely replace contaminated scrubbing medium with fresh scrubbing medium; and then resuming flow of said gas.

10. A method for controlling the depth of cracking in a gas cracking operation wherein a hydrocarbon gas is cracked in a heating zone, which comprises the cycle of:

passing a portion of said cracked hydrocarbon gas effluent from said heating zone through a portion of scrubbing fluid in a gas scrubbing zone; periodically at predetermined intervals of time discontinuing flow of said cracked gas through said scrubbing zone; rapidly displacing said scrubbing fluid in said gas scrubbing zone with a succeeding portion of fresh scrubbing fluid during said discontinuance; determining the specific gravity of said scrubbed gas; controlling the amount of heating medium passed to said heating zone in accordance with said specific gravity; and repeating said cycle thereby maintaining substantially uncontaminated scrubbing fluid in said scrubbing zone.

11. A method for controlling depth of cracking in a gas cracking operation wherein a hydrocarbon gas is cracked in a heating zone, which comprises: passing a stream of said cracked hydrocarbon gas effluent from said heating zone into a scrubbing medium maintained within a scrubbing zone; distributing said gas over a cross section of said scrubbing medium; dispersing said distributed gas into said scrubbing medium; contacting said dispersed gas and said scrubbing medium over a predetermined length of said zone for a predetermined period of time; withdrawing scrubbed gas from said zone; periodically at predetermined intervals of time discontinuing flow of said cracked gas into said scrubbing medium and simultaneously during said discontinuance passing fresh scrubbing medium upwardly through said scrubbing zone to completely replace contaminated scrubbing medium with fresh scrubbing medium and then resuming flow of said cracked gas into said fresh scrubbing medium; determining the specific gravity of said scrubbed gas; and controlling the amount of heating medium passed to said heating zone in accordance with said specific gravity.

12. An apparatus for scrubbing a gas to remove impurities therefrom which comprises, in combination: a vessel; gas inlet means extending into the lower portion of said vessel; a first valve in said gas inlet; gas outlet means extending from the upper portion of said vessel; a second valve in said gas outlet; scrubbing medium inlet means into said vessel; a third valve in said scrubbing medium inlet; scrubbing medium outlet means; a fourth valve in said scrubbing medium outlet; liquid overflow means; a check valve in said liquid overflow means; a liquid level controller within said vessel operatively connected to said scrubbing medium outlet, said level controller upon the liquid attaining a predetermined maximum level being adapted to permit the passage of liquid and to prevent the passage of gas through said scrubbing medium outlet; a gas distributor in the lower portion of said vessel; gas dispersing means adjacent to and positioned above said gas distributor within said vessel; and a time cycle controller operatively connected to each of said first, second, third and fourth valves so as to actuate said last named valves in predetermined relation to each other.

13. An apparatus for scrubbing a gas to remove impurities therefrom which comprises: a vessel; a gas inlet extending into the lower portion of said vessel, said gas inlet having a first valve therein; a gas outlet extending from the upper portion of said vessel; a second valve in said gas outlet; an overflow line connected to and extending from said gas outlet between said second valve and said vessel, said overflow line having a check valve therein; a scrubbing medium inlet; a third valve in said scrubbing medium inlet; a scrubbing medium outlet; a fourth valve in said scrubbing medium outlet; liquid level control means within said vessel; and a time cycle controller operatively connected to each of said first, second, third, and fourth valves.

References Cited in the file of this patent

UNITED STATES PATENTS

| Number | Name | Date |
|---|---|---|
| 690,986 | Neely | Jan. 14, 1902 |
| 716,803 | Zahm et al. | Dec. 23, 1902 |
| 1,037,413 | Bartlett | Sept. 3, 1912 |
| 1,283,916 | Rogers | Nov. 5, 1918 |
| 1,677,970 | Janette | July 24, 1928 |
| 1,788,280 | Dempsey | Jan. 6, 1931 |
| 2,039,950 | Chandler | May 5, 1936 |
| 2,072,384 | Schmidt | Mar. 2, 1937 |
| 2,290,461 | Young | July 21, 1942 |
| 2,328,655 | Lannert | Sept. 7, 1943 |
| 2,349,787 | Haswell | May 23, 1944 |
| 2,459,618 | Cartier | Jan. 18, 1949 |
| 2,609,277 | McNamara | Sept. 2, 1952 |
| 2,716,422 | Whitlock | Aug. 30, 1955 |